June 2, 1936.  N. W. PEARSON  2,042,624
BRAKE
Filed March 17, 1933  3 Sheets-Sheet 3
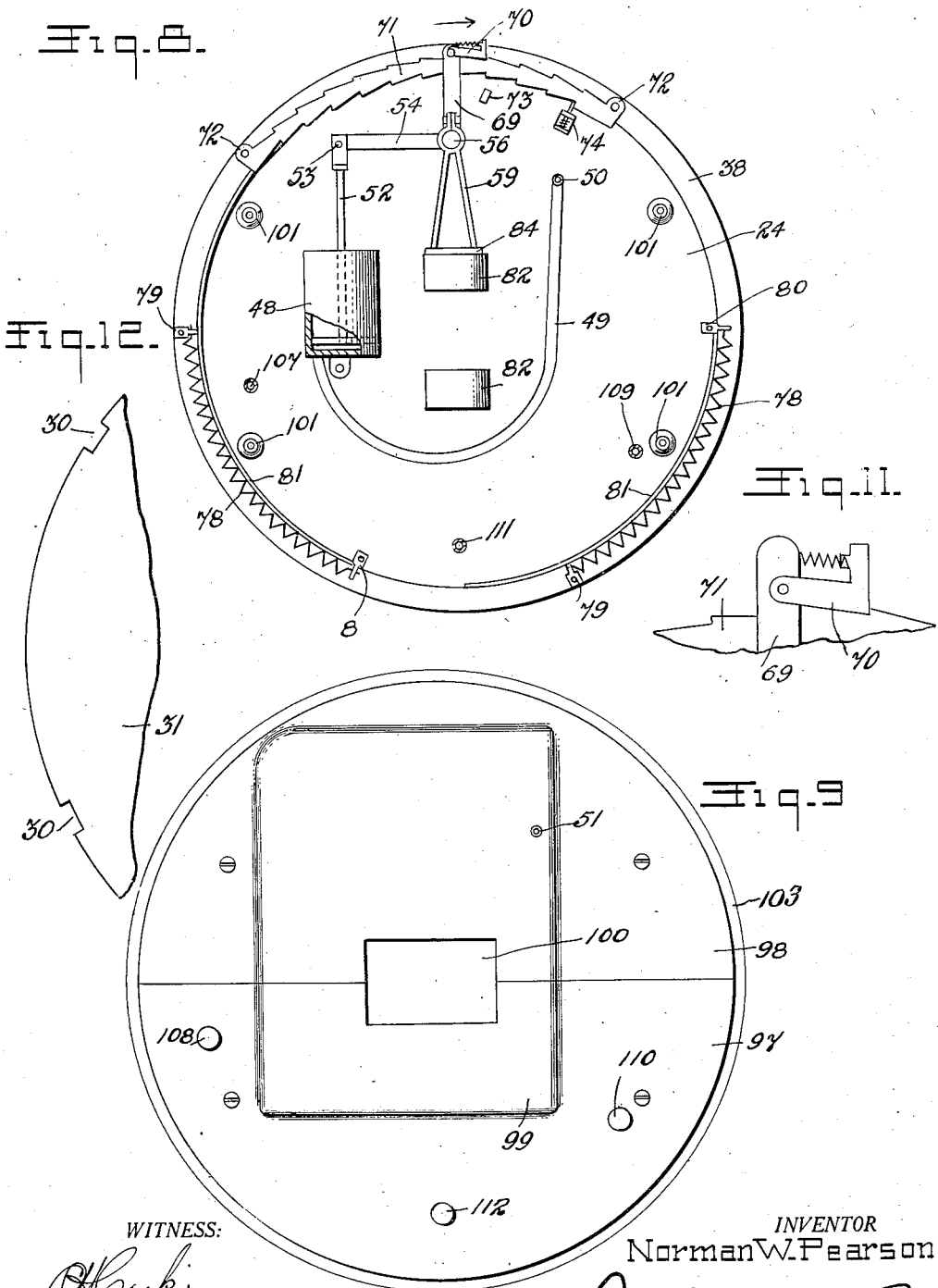

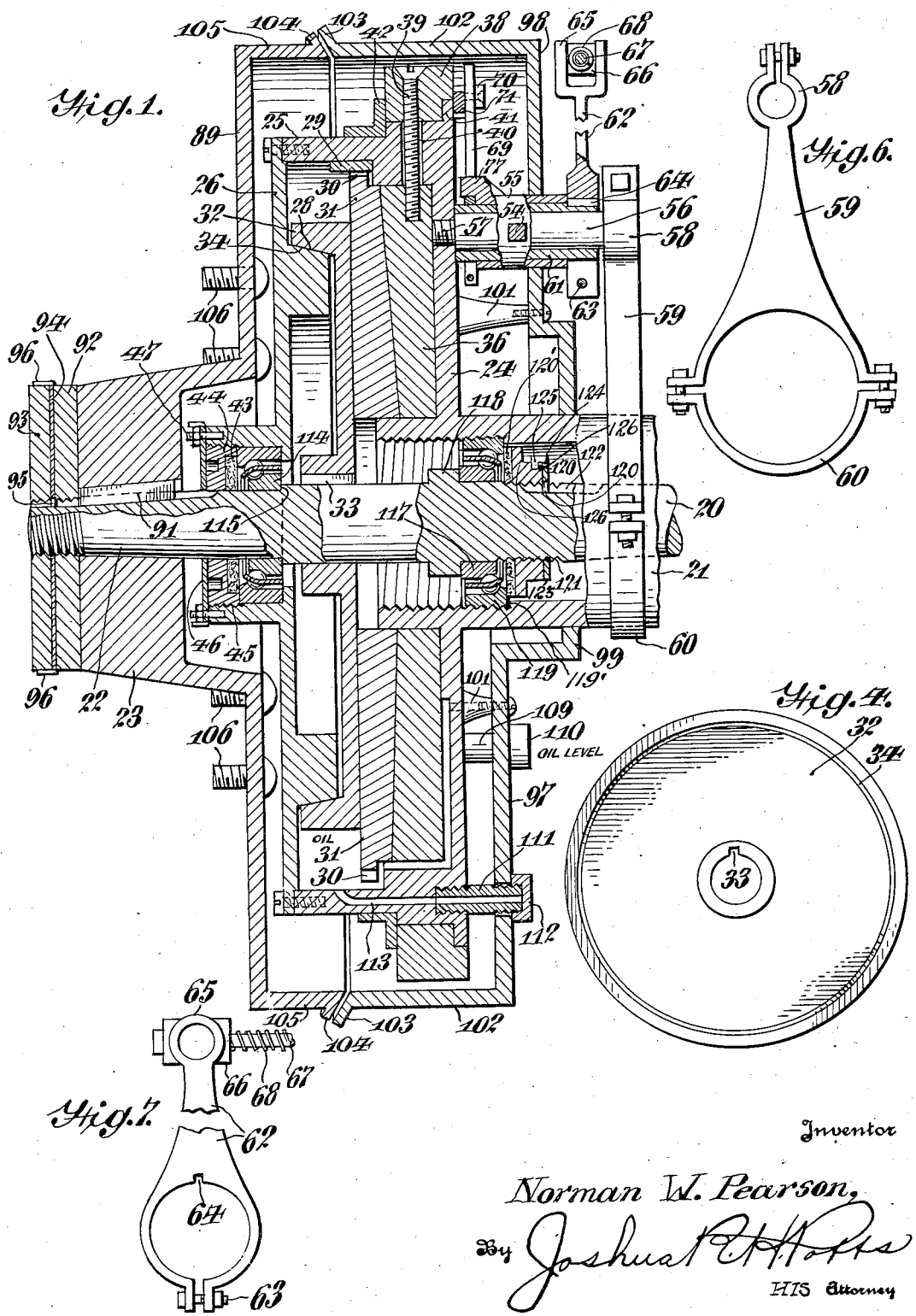

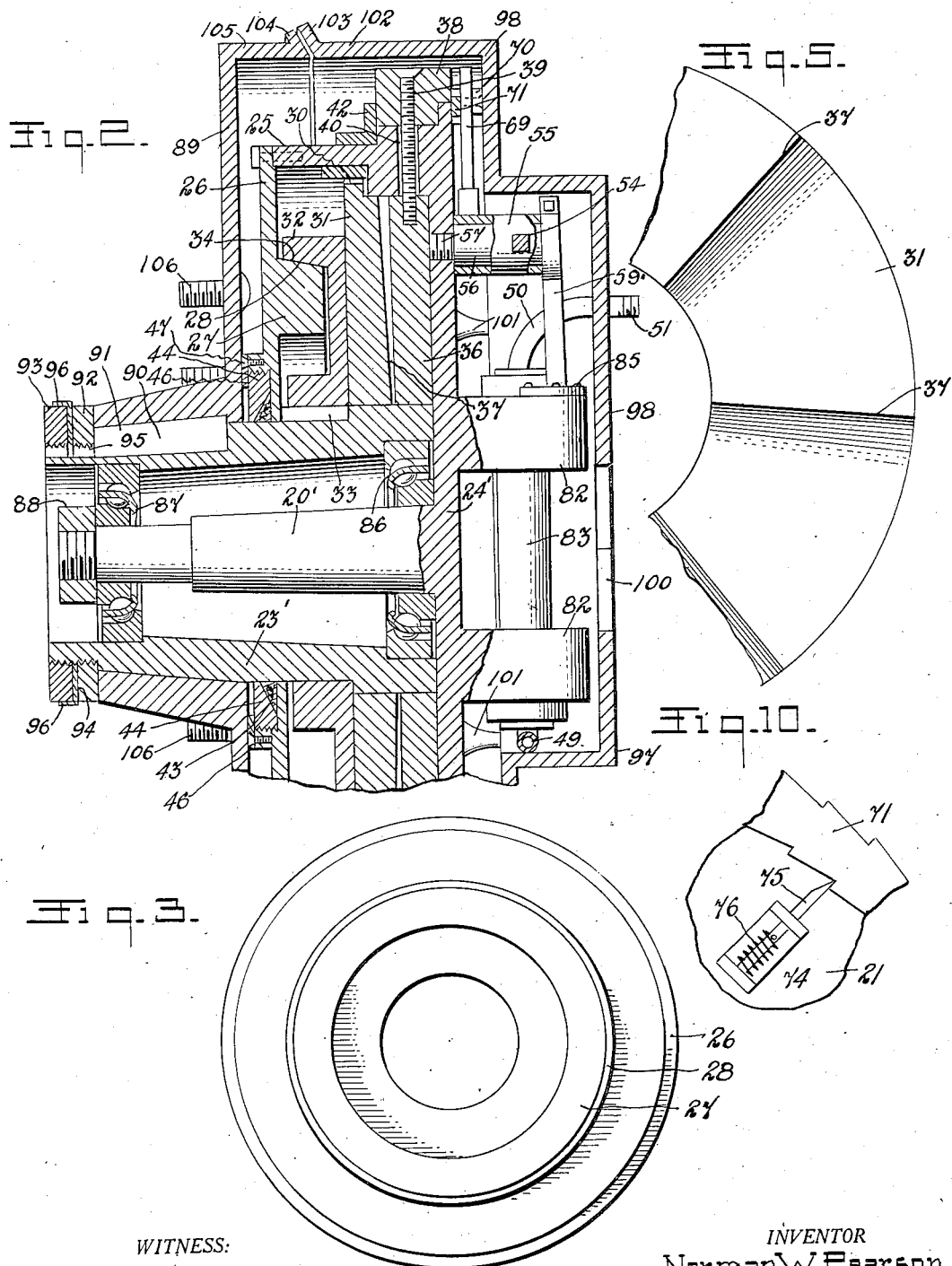

Patented June 2, 1936

2,042,624

UNITED STATES PATENT OFFICE 2,042,624

BRAKE

Norman W. Pearson, Hatboro, Pa.

Application March 17, 1933, Serial No. 661,277

10 Claims. (Cl. 188—71)

This invention relates to brakes, and has for an object to provide a brake especially adapted, though not exclusively limited, to use in connection with automotive vehicles, and exhibiting such variation as is necessary to conform to the requirements of rear brakes and front brakes.

A further object of the invention is to provide a brake, the contacting and frictional parts of which are constructed to run in oil.

A further object of the invention is to provide a brake having cup and cone interengaging parts, one of which rotates with the wheel of the vehicle, with a housing surrounding the cone and cup adapted to retain oil within the housing, for lubricating the cone and cup connection.

A further object of the invention is to provide improved means whereby wear occurring between the cup and cone frictional parts due to lengthy use may be taken up automatically so that the brake will continue to function through a long period of time.

A further object of the invention is to provide a brake of the cup and cone type adapted to be actuated by hydraulic means.

A further object of the invention is to provide improved parts and instrumentalities for carrying out the objects of the invention hereinbefore recited.

The invention, therefore, comprises means cooperating with the axle of an automotive vehicle, whereby a part of the structure is turned in consonance with the turning of the wheel, and other parts retained in positions stationary relative to the frame of the vehicle, with cup and cone interengaging parts adapted to exert frictional resistance one against the other, and one movable axially relative to the other, said cup and cone being included within a housing properly arranged to retain oil in engagement with said cup and cone with cam faces interengaging, one of which may be moved about the axis manually, or by the application of force, in any approved manner so that such movement is translated into the movement longitudinally of the axle of the interengaging parts.

In the drawings:

Figure 1 is a view of the brake substantially in diametrical section and arranged as a rear brake, Figure 2 is a fragment shown substantially in diametrical section but arranged as a front brake, Figure 3 is a view in elevation of the disk carrying the cone, Figure 4 is a view in elevation of the cup member, Figure 5 is a view in elevation of either the cone shown at Figure 3, or the cup shown at Figure 4, seen from the reverse side and disclosing the cams, Figure 6 is a view in elevation of a support for the brake trunnion as shown at Figure 1, Figure 7 is a view in elevation of the manual brake lever shown in edge elevation, broken at Figure 1, Figure 8 is a view in elevation of the rear side of the brake with the housing removed and illustrating the front wheel type, Figure 9 is a view in elevation of the housing which encloses the structure shown at Figure 8, Figure 10 is a detailed view in elevation of the segmental rack and latch for taking up the wear in the brake, Figure 11 is a view in elevation of the detent engaging the segmental rack and serving to apply braking stress to the structure, and Figure 12 is a fragmental elevation of one of the cam disks.

Like characters of reference indicate corresponding parts throughout the several views.

In the present development of vehicles of the automotive type, the brakes for the front and rear wheels must vary slightly in view of the difference of structure apparent in the vehicle itself. For instance, the rear wheels are mounted rigidly upon axles which rotate with the wheels, while the front wheels are mounted upon axles which are stationary except for angular movement in steering.

A further difference is that at the present time the so-called emergency brake or hand operated brake is applied to the rear wheels only, whereas the servo-brake operates brakes for all four wheels.

The present invention adapts itself to this custom or condition and provides means whereby brakes embodying the same principle and substantially the same mechanical features may be employed upon both the front and rear wheels.

Taking up Figure 1 as an example, it will be seen that this is intended as a rear wheel construction, the axle 20 being mounted in the housing 21 and provided with a tapered section 22 upon which the hub 23 is applied.

In the present structure a plate 24 is mounted to rotate relative to the axle or, more accurately, permit the rotation of the axle relative to the plate 24 which is held against rotation by any approved structure. As the means for holding this against rotation will vary with different types of vehicles, no attempt has been made to show such retaining means.

The plate 24 is provided with a circular flange 25 which is provided with a cover member 26 forming a boss about the axle part 22. This cover member 26 is provided with an annular shoulder 27 which has a peripheral conically inclined face 28.

The flange 25 is also provided with one or more stops 29 secured or formed integrally about the interior thereof, and engaging in notches 30 formed in the disk 31. This disk 31 is mounted to slide upon the housing 21 and one of its sides bears against the cup member 32, which is splined to the hub 23, as shown at 33.

This cup member 32 has a conically inclined cam face 34 which is mounted to engage the cam face 28 of the cover member 26. When, therefore, this cup member slides upon the axle 20 and upon the spline 33, it brings into engagement the conical surfaces of the cover member 26 and cup member 32.

Sufficient stress exerted upon these parts in such interconnection will exert a braking stress upon the cup member, which is transmitted to the axle through the spline 33.

For the purpose of moving the cam plate 31 to perform this function, a second cam plate 36 is mounted to be moved in a rotary direction upon the housing 21.

The plates 31 and 36 are each provided upon their contacting surfaces with rosette cams 37, shown more particularly at Figure 5, in which the numeral 31 indicates the disk so designated but the cams are identical in reversed order upon the plate 36. The interengagement of these cam surfaces and the rotary movement of the plate 36 serves to move the plate 31 longitudinally upon the housing 21 and to bear against the cup member 32 to force it into braking engagement with the cone 26.

With the cover member 26 in place, as described, the structure thus far disclosed is wholly enclosed within a housing which is oil-tight, and adapted to retain oil for the purpose of lubricating the parts whereby the brake will run in oil as distinguished from the present teaching that oil must not be applied to a brake.

For moving the plate 36 as described, a ring 38 is mounted surrounding the flange 25 and is connected to the plate 36 by means of a pin 39 which passes through a slot 40 in the flange 25 so that a rotary movement of the ring 38 upon the exterior of the housing is transmitted by this pin into a like rotary movement of the plate 36 within the housing.

It will be noted that the slot 40 is at the top of the housing and that the oil maintained within the housing is not, therefore, likely to escape through such slot as all parts, with the exception of the slot 40 and pin 39, are relatively tight fitting.

To maintain the ring 38 in position, the flange 25 is provided with an annular shoulder 41 which engages one side of the ring 38, and a stop 42 upon the opposite side of the ring 38 is secured in any usual and well-known manner, as by the use of clamping bolts (not shown).

So that the housing may be substantially oil-tight relative to the hub, a gasket 43 is employed with a compression follower 44 applied by means of screw threads 45. An annular plate 46 is employed to hold the follower in position, which in turn is secured by screws 47.

For the purpose of operating the ring 38 and, therefore, operating the brake, a cylinder 48 is rigidly applied to the plate 24 with a tube 49 leading therefrom to some point adjacent the top of the structure, as at 50, where means, as the screw thread 51, is provided for connection with a conduit extending to any approved source of fluid pressure.

The cylinder 48 is provided with a piston (not shown), and piston rod 52, which extends upwardly and is pivoted at 53 to an arm 54. This arm 54 is integral, or rigidly associated with a sleeve 55 which is mounted to oscillate upon a trunnion 56. The trunnion is supported by having one end screw-threaded into the plate 24, as at 57, and the outer end supported by a brace.

At Figure 6 the type of brace is shown employed upon the rear brake. This comprises a clamp 58 which engages the outer end of the trunnion 56 and a strut 59, with a clamp collar 60 which clamps about the housing 21 of the rear end.

As applied to the rear brake, the sleeve 55 has mounted therein a second sleeve 61 to which is rigidly connected the lever 62, a clamping screw 63, and key connection 64, accomplishing the purpose. The upper end of this lever 62 is bifurcated, as shown at 65, and a block 66 pivoted therein.

Through this block a rod 67 is slidably mounted and extends to any type of energy exerting mechanism. A spring 68 permits the lever 62 to move slidably relative to the rod 67, while the rod 67 remains stationary.

Also rigidly mounted upon the sleeve 61 is a lever 69 so that at every impulse imparted to the lever 62 by the hand brake lever, the lever 69 is also actuated. This lever 69 is provided with a spring pressed detent 70 which engages a segmental rack 71 rigidly secured to the ring 38, in any approved manner, as by the offsets 72.

When, therefore, the lever 69 is moved in the direction indicated by the arrow at Figure 8, the segment 71 is moved therewith, moving also the ring 38, which movement is transmitted to the operating parts, as hereinbefore noted.

It is intended that the movement of the ring 38 for each braking impulse transmitted to the lever 69 shall not be materially greater than the inclines accompanying the notches, or forming the notches on the segment 71. A stop 73 is provided for limiting the movement of the lever 69.

When, however, because of wear or other conditions, the segment is moved a greater distance than provided by one notch, a lock shown as an entirety at 74 in Figure 8 engages one of the notches of the segment 71.

As shown in detail at Figure 10, the sliding bolt 75 is pressed by the spring 76 to accomplish this purpose. When the wear has permitted the movement of the segment 71 and ring 38 to such an extent that the latch 74 will lock, then the return of the detent 70 will engage another one of the notches of the segment 71 and will continue to function in the same manner.

To permit the operation of the lever 69 from the hydraulic cylinder 48, the sleeve 55 is provided with a lug 77 which overhangs the lever 69 so that when the sleeve 55 is moved by the lever 54, then such movement is transmitted to the lever 69 which in turn oscillates the sleeve 61 and therewith the lever 62, which moves against the tension of the spring 68 along the rod 67.

To retract the ring 38 for subsequent action, springs 78 are provided, secured at one end by the clip 79 to the ring and at the opposite end by the clip 80 to the plate 24. A guide plate 81 extends about the plate adjacent to and supporting the curvature of the springs so that such curvature is constantly maintained.

To adopt the brake for use as a front wheel brake, the plate 24' carries the knuckle members 82 through which extends the king bolt 83. In this embodiment also, only a single sleeve 55 is required upon the strut 56 and the lever 69' may be connected directly to and rigid with the sleeve 55. In fact, it may be formed integral therewith.

In view of the modification, the supporting strut 59' differs from the strut 59 in having a base 84 of horseshoe shape secured to the knuckle elements 82 and, therefore, partially surrounding the king bolt 83. It is secured in any approved manner, as by the screws or rivets 85.

As the hub 23' must rotate about the axle 20', ball bearing races 86 and 87 are provided. In both types the wheels are secured to the axle by means of nuts 88, in one case bearing directly against the hub, and in the other case, bearing against the ball bearing unit 87. Also, it will be noted that in both forms, the journal of the wheel extends through the oil chamber. In the form shown in Fig. 1, this constitutes the rotary axle 20, whereas in the form shown in Fig. 2 it comprises the hub 23'.

The operative structure above disclosed is encased. The casing comprises a section 89 which is rigidly secured to the hub 23, but having a tapered bore 90, and secured by means of a key 91. This taper permits the sleeve to be seated upon the hub firmly and lock nuts 92 and 93 are provided for holding the member in such position.

Interlying these nuts 92 and 93 a lock washer 94 is provided, having a tongue 95 which passes into the groove provided for the key 91 and about its periphery has a plurality of tongues 96 which are bent down over the plane parts of the nut 93.

The rear part of the casing varies slightly in the two types. At Figure 9 is shown the type adapted especially for the front brake. It comprises two halves 97 and 98 with a bulge 99 properly proportioned to cover the underlying mechanism. It will be understood, of course, that the bulge in the two plates may vary slightly.

At Figure 9 an opening 100 is shown at that part of the axle cooperating with the knuckle members 92 and engaged by the king bolt 83, the slot being made wide enough to permit the wheel to angle relative to the axle.

These sections of casing are supported by means of lugs 101 which are spaced at intervals about and integral with the plate 24 and extend outwardly to such position as will properly be engaged by the rear section of the casing.

These casings are provided with flanges 102 which extend forwardly and are provided with upturned fins 103 which rotate as nearly as clearance will permit in relation to like fins 104 formed upon the flanges 105 of the front section of the casing 89.

Both of these front casing sections are provided with threaded studs 106 by which a wheel is secured to this structure. As shown in the drawings, this is designed to receive a wheel of the disk, or wire-spoke type, but it is obvious that a modification could be made to accommodate other types of wheels.

The housing formed by the flange 25 and cover member 26, as heretofore explained, is intended for retention of oil. To that end a filler nipple 107 is provided, capped as at 108. (See Figures 8 and 9.) As shown in Figure 1, the lower part of the member 24 is cut away to permit of the ready flow of oil to all parts of the oil chamber. This cut away provides a space between the member 24 and the cam member 36.

A predetermined height for oil within this housing has been considered and an overflow 109 is provided, which is capped at 110. Also, a drain 111 is closed by the cap 112. From this drain nipple 111 a conduit 113 extends from the interior of this housing to the exterior, it being understood that the inlet and overflow are similarly constructed to communicate with this chamber.

The structure is constructed to accommodate ball bearings, and to that end the ball race 114 bears against a shoulder 115 on the axle 20 and the companion ball race 116 is engaged by the follower 44. The ball race 117 bears against the collar 118 formed upon the axle 20 while the companion ball race 119 is engaged by the shoulder 119' and the nut 120 upon the threaded part 121 of the axle clamps the gasket 120' against the ball race part 119. The threaded part 121 is grooved, as at 122, and a washer 123 with a tongue 124 engages in the groove. The washer 123 has a tongue 125 which is bent into one of a number of recesses 126 formed in the sides of the nut 120.

In operation, with the parts assembled as shown at Figures 1 and 2, the filler cap 108 and the drain cap 110 will be removed and oil introduced through the filler nipple 107 until it overflows at 109. This indicates the proper height of oil within the inner housing.

With the wheel attached in the usual manner, the device will function as follows:

When the axle 20 is rotated under power, it will drive the hub 23 by reason of the spline connection 91 and by reason of the connection of the sleeve 90 to this hub, will drive the plate 89 and therewith the wheel.

When the brake is to be applied, hydraulically, hydraulic pressure will be established within the cylinder 48 by any approved pumping construction. This will actuate the lever 54 to rotate the sleeve 55, and by reason of the lug 77 bearing against the lever 69, will move that lever in the direction indicated by the arrow at Figure 8, which will carry with it the rack 71 and the ring 38.

The movement of the ring 38 will be transmitted by the pin 39 to the disk 36 and by reason of the cam arrangement between this disk 36 and the disk 31, will move the disks 31 toward the wheel. This disk 31 is held against rotation by the guide members 29, but will exert pressure upon the cup member 32 which is rotated with the hub by reason of the key 33.

The plate 26 carrying the cone 27 is held against rotation by its engagement with the flange 25, hence the engagement of the two conical faces 28 and 34 will exert braking tension upon the rotating parts. If the brake is to be applied manually, then the stress will be exerted upon the lever 62, which will be transmitted directly to the lever 69, which is rigidly attached to the sleeve 61 to which the lever 62 is likewise attached.

Beyond this point the action is exactly the same as the action when the brake is operated hydraulically.

In the type shown at Figure 2, the axle 20' is, of course, stationary, and the hub 23' rotated about this axle upon the ball bearing units 86 and 87. Aside from this, however, the action is identical, as the hydraulic pressure acting upon the cylinder 48 will similarly operate the arms 55 and 69 whereupon the brake action will be the same. For the front wheel, as will be noted, no provision is made for manual actuation other than through the hydraulic installation.

Of course the brake herein illustrated may be modified and changed in various ways without departing from the invention herein set forth and hereinafter claimed.

I claim:—

1. A brake comprising an axle, a hub mounted upon the axle, means carried by the hub for mounting a traction wheel, a housing non-rotatively embracing the axle and provided with a friction element within the chamber produced by said housing, a friction element within the housing carried by and rotating with the hub and adapted to move axially thereof, a cam within the housing positioned to move the friction element into frictional engagement with the non-rotative friction element, a ring encircling said housing, said housing having a circumferential slot therein underlying said ring, a pin carried by said ring extending through said slot and into operative engagement with said cam within the housing and serving to limit the movement of the ring by the limited extent of the slot, a rack mounted upon the ring without the housing, a lever fulcrumed upon the housing adjacent to the rack, a pawl carried by the lever in engagement with the rack, means to move the lever through an arc having a definite stop provided therefor, a detent carried by the housing, said detent being adapted to engage the rack at a different position when the lever has reached its limiting stop, and a shell enclosing all of said organization.

2. A brake comprising a lubricant-containing housing, an axle extending through said housing, a hub mounted upon said axle and adapted to rotate relative to said housing, means carried by said hub for mounting a traction wheel, a friction unit mounted within the housing adapted to be moved into frictional engagement with a part of said housing, a cam disk mounted upon the axle and by rotary movement tending to move one of said frictional elements into engagement with the other frictional element, a ring encircling the housing, said housing having a slot underlying the ring, a pin extending from the ring through said slot and into engagement with the cam, a lever fulcrumed upon the housing adjacent the ring, a segmental rack carried by the ring in operative relation to the lever, a pawl carried by the lever spring pressed into engagement with the rack, means to apply hydraulic stress to the lever, and means to apply stress to the lever.

3. A brake comprising a fixed disc having a peripherial flange, a closure fixed to the flange forming a completely closed oil chamber, an oil level gauge communicating with the chamber, a journal extending through the closure and provided with oil restraining packing, interacting cone and cup members within the chamber, one of which is carried by and rotates with the journal and one carried by and held against rotation by the closure, one of said members being movable longitudinally of the journal, means within the chamber to effect said longitudinal movement, and means externally of the chamber to apply stress to actuate said effecting means.

4. A brake comprising a fixed disc having a peripherial flange, a closure fixed to the flange forming a completely closed oil chamber, a journal extending through the closure and provided with oil restraining packing, interacting cone and cup members within the chamber, one of which is carried by and rotates with the journal and one carried by and held against rotation by the closure, one of said members being movable longitudinally of the journal, means within the chamber including a cam ring to effect said longitudinal movement, and means externally of the chamber to apply stress to actuate said effecting means.

5. A brake comprising a fixed disc having a peripherial flange, a closure fixed to the flange forming a completely closed oil chamber, a journal extending through the closure and provided with oil restraining packing, interacting cone and cup members within the chamber, one of which is carried by and rotates with the journal and one carried by and held against rotation by the closure, one of said members being movable longitudinally of the journal, means within the chamber to effect said longitudinal movement, means externally of the chamber to apply stress to actuate said effecting means, and a casing enclosing all of said organization, part of which is fixed and part rotating with the journal.

6. A brake comprising a fixed disc having a peripherial flange, a closure fixed to the flange forming a completely closed oil chamber, a journal extending through the closure and provided with oil restraining packing, interacting cone and cup members within the chamber, one of which is carried by and rotates with the journal and one carried by and held against rotation by a chamber wall, one of said members being movable longitudinally of the journal, means within the chamber to effect said longitudinal movemen, means externally of the chamber to apply stress to actuate said effecting means.

7. A brake comprising a fixed disc having a peripherial flange, a closure fixed to the flange forming a completely closed oil chamber, an oil level gauge communicating with the chamber, inlet and outlet oil conduits communicating with said chamber, a journal extending through the closure and provided with oil restraining packing, interacting cone and cup members within the chamber, one of which is carried by and rotates with the journal and one carried by and held against rotation by a chamber wall, one of said members being movable longitudinally of the journal, means within the chamber including a cam ring to effect said longitudinal movement, means externally of the chamber to apply stress to actuate said effecting means.

8. A brake comprising a fixed disc having a peripherial flange, a closure fixed to the flange forming a completely closed oil chamber, a journal extending through the disc and closure and provided with oil restraining packing, interacting cone and cup members within the chamber, one of which is carried by and rotates with the journal and one carried by and held against rotation by a part of the chamber structure, one of said members being movable longitudinally of the journal, means within the chamber to effect said longitudinal movement, and means externally of the chamber to apply stress to actuate the said effecting means.

9. A brake comprising a fixed disc having a peripherial flange, a closure fixed to the flange forming a completely closed oil chamber, an axle extending through the closure and integral with the disc, a hub mounted to rotate upon the axle and extending through the closure and provided with oil restraining packing, interacting cone and cup members within the chamber, one of which is carried by and rotates with the axle and the other held against rotation by the closure, one of said members being movable longitudinally of the hub, means within the chamber to effect said longitudinal movement, and means externally of the chamber to apply stress to actuate said effecting means.

10. A brake comprising a fixed disc having a peripherial flange, a closure fixed to the flange forming a completely closed oil chamber, inlet and outlet oil conduits communicating with said chamber, a journal extending through the closure and provided with oil restraining packing, interacting cone and cup members within the chamber, one of which is carried by and rotates with the journal and one carried by and held against rotation by the closure, one of said members being movable longitudinally of the journal, means within the chamber to effect said longitudinal movement, and means externally of the chamber to apply stress to actuate said effecting means.

NORMAN W. PEARSON.